United States Patent
Wu et al.

(10) Patent No.: US 9,308,828 B2
(45) Date of Patent: Apr. 12, 2016

(54) POWER SYSTEM OF ELECTRIC VEHICLE, ELECTRIC VEHICLE COMPRISING THE SAME AND METHOD FOR HEATING BATTERY GROUP OF ELECTRIC VEHICLE

(71) Applicant: BYD COMPANY LIMITED, Shenzhen (CN)

(72) Inventors: Xingchi Wu, Shenzhen (CN); Hongjun Wang, Shenzhen (CN); Shibin Xie, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/403,368

(22) PCT Filed: May 22, 2013

(86) PCT No.: PCT/CN2013/076050
§ 371 (c)(1),
(2) Date: Nov. 24, 2014

(87) PCT Pub. No.: WO2013/174259
PCT Pub. Date: Nov. 28, 2013

(65) Prior Publication Data
US 2015/0142237 A1     May 21, 2015

(30) Foreign Application Priority Data
May 22, 2012   (CN) .......................... 2012 1 0160396

(51) Int. Cl.
*B60L 11/18*     (2006.01)
*B60L 1/00*      (2006.01)
(Continued)

(52) U.S. Cl.
CPC ............. *B60L 11/1875* (2013.01); *B60L 1/003* (2013.01); *B60L 1/02* (2013.01); *B60L 3/0023* (2013.01);
(Continued)

(58) Field of Classification Search
CPC ..... B60L 11/00; B60L 11/002; B60L 11/005; B60L 11/1861; B60L 11/187; B60W 20/106; B60W 10/26; B60W 10/08; H01M 10/5006; H01M 10/5016; H01M 10/615
USPC .......... 701/22; 180/65.1, 65.21, 65.29, 65.31; 903/903
See application file for complete search history.

(56) References Cited

U.S. PATENT DOCUMENTS 7,154,068 B2    12/2006  Zhu et al.
7,769,505 B2 *   8/2010  Rask ........................ B60K 6/24
                                                     180/65.275
(Continued)

FOREIGN PATENT DOCUMENTS

CN    1701986 A    11/2005
CN    1725136 A     1/2006
(Continued)

*Primary Examiner* — Dalena Tran
(74) *Attorney, Agent, or Firm* — Anova Law Group, PLLC

(57) ABSTRACT

A power system of an electric vehicle, an electric vehicle including the power system and a method for heating a battery group of the electric vehicle are provided. The power system of the electric vehicle includes: a battery group; a battery heater connected with the battery group; a battery management device connected with the battery group and the battery heater respectively, and configured to control the battery heater (102) to heat the battery group intermittently when a temperature of the battery group is lower than a first temperature threshold and a residual electric quantity of the battery group is larger than an electric quantity threshold; an electric distribution box; a motor; a motor controller connected with the motor and the electric distribution box respectively; and an isolation inductor.

25 Claims, 8 Drawing Sheets

(51) Int. Cl.
  *B60L 1/02* (2006.01)
  *B60L 3/00* (2006.01)
  *B60L 3/04* (2006.01)
  *H01M 10/625* (2014.01)
  *H01M 10/633* (2014.01)
  *H01M 10/613* (2014.01)
  *B60W 10/08* (2006.01)
  *B60W 10/26* (2006.01)
  *B60W 30/194* (2012.01)
  *H01M 10/615* (2014.01)

(52) U.S. Cl.
  CPC ............... *B60L 3/0046* (2013.01); *B60L 3/04* (2013.01); *B60L 11/1805* (2013.01); *B60L 11/1864* (2013.01); *B60L 11/1874* (2013.01); *B60W 10/08* (2013.01); *B60W 10/26* (2013.01); *B60W 30/194* (2013.01); *H01M 10/5006* (2013.01); *H01M 10/5016* (2013.01); *H01M 10/613* (2015.04); *H01M 10/625* (2015.04); *H01M 10/633* (2015.04); *B60L 2240/545* (2013.01); *B60L 2250/16* (2013.01); *H01M 2220/20* (2013.01); *Y02T 10/7005* (2013.01); *Y02T 10/7061* (2013.01)

(56) References Cited

U.S. PATENT DOCUMENTS

| | | | |
|---|---|---|---|
| 8,352,106 B2 * | 1/2013 | Falkenstein | B60K 6/445 |
| | | | 180/65.265 |
| 2005/0274705 A1 | 12/2005 | Zhu et al. | |
| 2011/0272391 A1 | 11/2011 | Zhu et al. | |
| 2011/0288708 A1 | 11/2011 | Katono et al. | |

FOREIGN PATENT DOCUMENTS

| | | |
|---|---|---|
| CN | 101503063 A | 8/2009 |
| CN | 201400078 Y | 2/2010 |
| CN | 101962000 A | 2/2011 |
| CN | 102055042 A | 5/2011 |
| CN | 202219728 U | 5/2011 |
| CN | 201893429 U | 7/2011 |
| CN | 102224049 A | 10/2011 |
| CN | 202641415 U | 1/2013 |
| CN | 202656881 U | 1/2013 |
| DE | 102009054461 A1 | 6/2011 |
| JP | 3509382 B2 | 3/2004 |
| JP | 4120025 B2 | 7/2008 |
| WO | 2011069729 A1 | 6/2011 |

* cited by examiner

POWER SYSTEM OF ELECTRIC VEHICLE, ELECTRIC VEHICLE COMPRISING THE SAME AND METHOD FOR HEATING BATTERY GROUP OF ELECTRIC VEHICLE

CROSS-REFERENCES TO RELATED APPLICATIONS

This application is a national phase entry under 35 U.S.C. §371 of International Application No. PCT/CN2013/076050, filed on May 22, 2013, which claims the priority to and benefits of Chinese patent application No. 201210160396.7, filed with the State Intellectual Property Office of P. R. C., on May 22, 2012, the entire contents of all of which are incorporated herein by reference.

FIELD OF THE INVENTION

Exemplary embodiments of the present disclosure relate generally to a power system and, more particularly, to a power system of an electric vehicle, an electric vehicle comprising the power system and a method for heating a battery group of the electric vehicle.

BACKGROUND

With the development of the science and technology, new energy vehicles, especially electric vehicles, gradually enter into ordinary families as a means of transportation. The performance requirement, especially the comfort requirement of a user for the vehicle, is higher and higher, which requires that the vehicle must adapt to different operating requirements. But currently most electric vehicles cannot satisfy such requirements. Especially in winter, the temperature is low so that the capability of a battery, no matter the discharge capability or the battery capacity, may be decreased or the battery cannot even be used. Specifically, the work temperature of the battery especially lithium ion battery is generally within a range from −20° C. to 55° C., and the battery is not allowed to be charged at a low temperature. Under a low temperature condition, the battery in the electric vehicle may have the following problems. (1) The lithium ions may be deposited easily at the negative electrode and lose the electrical activity at the low temperature, and therefore, if the battery in the electric vehicle is frequently used at the low temperature, the life of the battery may be shortened and a safety problem may be caused accordingly. (2) When the lithium ion battery is charged at the low temperature, the lithium ions may be deposited easily at the negative electrode to become dead ions and thus the capacity of the battery may be decreased. Moreover, the deposited ions grow larger and larger during the continuous use, thus leading to a potential danger such as an internal short circuit. (3) The discharge capability of the battery is limited at the low temperature. All of the problems listed above may be not favorable for the electric vehicle which uses green and environment friendly new energy.

The method for heating a battery is an important technology in the electric vehicle field. A heating strategy of the battery and the performance of the battery heater influence the comfort, operation stability and safety of the vehicle directly. Many new technologies are applied in the battery heating, but because of the self-capability defects, these technologies are not widely applied in the vehicle field. For example, a thermal insulation sleeve is provided to warm a battery by thermal insulation material; an infrared radiation film is used to heat the battery and a thermal insulation sleeve is provided to keep warm; or a heating patch is attached on the surface of the battery. These methods are only suitable for the fixed battery. Furthermore, using the external power to heat the battery is not suitable for the vehicle which is not fixed in position. Therefore, the above methods have not been widely applied in the electric vehicle field.

BRIEF SUMMARY OF THE DISCLOSURE

According to a first aspect of the present disclosure, a power system of an electric vehicle is provided. The power system of the electric vehicle comprises: a battery group; a battery heater, connected with the battery group and configured to charge and discharge the battery group to heat the battery group; a battery management device, connected with the battery group and the battery heater respectively, and configured to control the battery heater to heat the battery group intermittently when a temperature of the battery group is lower than a first temperature threshold and a residual electric quantity of the battery group is larger than an electric quantity threshold; an electric distribution box, configured to distribute a voltage output by the battery group; a motor; a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and an isolation inductor, connected between the battery group and the electric distribution box, in which an inductance of the isolation inductor matches with a capacitance of the pre-charging capacitor.

With the power system of the electric vehicle according to embodiments of the present disclosure, by using a large current discharge of the battery group in the electric vehicle, the internal resistor of the battery itself may be heated so that the battery group may be heated. Without any external power supply, the electricity for heating is totally supplied by the battery group. A heating management may be performed for the battery group by the battery management device and the battery heater, which may greatly reduce the restriction on the use of the electric vehicle at the low temperature, thus satisfying the requirements of running and charging at the low temperature. Moreover, the power system heats the battery group directly, and therefore, higher heating efficiency, lower cost, and better utility may be obtained. In addition, the power system according to embodiments of the present disclosure is capable of heating the battery group intermittently, i.e., heating the battery group for one time period and then suspending heating for another one time period, and performing in this way circularly. Therefore, the battery group may be heated periodically, and thus the negative influence of large current on the battery group may be decreased and the life of the battery group may be prolonged.

According to a second aspect of the present disclosure, an electric vehicle comprising the above power system is provided. The electric vehicle can normally run in a cold region and the battery group can be heated while the electric vehicle is running, thus ensuring a safe and smooth running.

According to a third aspect of the present disclosure, a method for heating a battery group of an electric vehicle is provided. The method comprises: detecting a temperature and a residual electric quantity of the battery group; if the temperature of the battery group is lower than a first temperature threshold and the residual electric quantity of the battery group is larger than an electric quantity threshold, controlling a battery heater to heat the battery group intermittently; and if the temperature of the battery group is lower than the first temperature threshold and the residual electric quantity of the battery group is lower than the electric quantity threshold, indicating the battery group is inhibited from being heated or charged and the electric vehicle is inhibited from being driven.

With the method for heating the battery group of the electric vehicle according to embodiments of the present disclosure, the battery group may be heated directly without any external power supply. The temperature of the battery group may be increased to a required temperature and then the battery group may be charged or discharged normally, which may greatly reduce the restriction on the use of the electric vehicle at the low temperature, thus satisfying the requirements of running and charging at the low temperature. In addition, the method according to embodiments of the present disclosure is capable of heating the battery group intermittently, i.e., heating the battery group for one time period and then suspending heating for another one time period, and performing in this way circularly. Therefore, the battery group may be heated periodically, and thus the negative influence of large current on the battery group may be decreased and the life of the battery group may be prolonged. Furthermore, the method according to embodiments of the present disclosure may heat the battery group with different powers according to real-time temperature of the battery group, thus performing a finer control on the power system, optimizing the performance of the battery group, and ensuring the safety of the battery group.

BRIEF DESCRIPTION OF THE DRAWINGS

Having thus described exemplary embodiments of the present disclosure in general terms, reference will now be made to the accompanying drawings, which are not necessarily drawn to scale.

Figure 1:
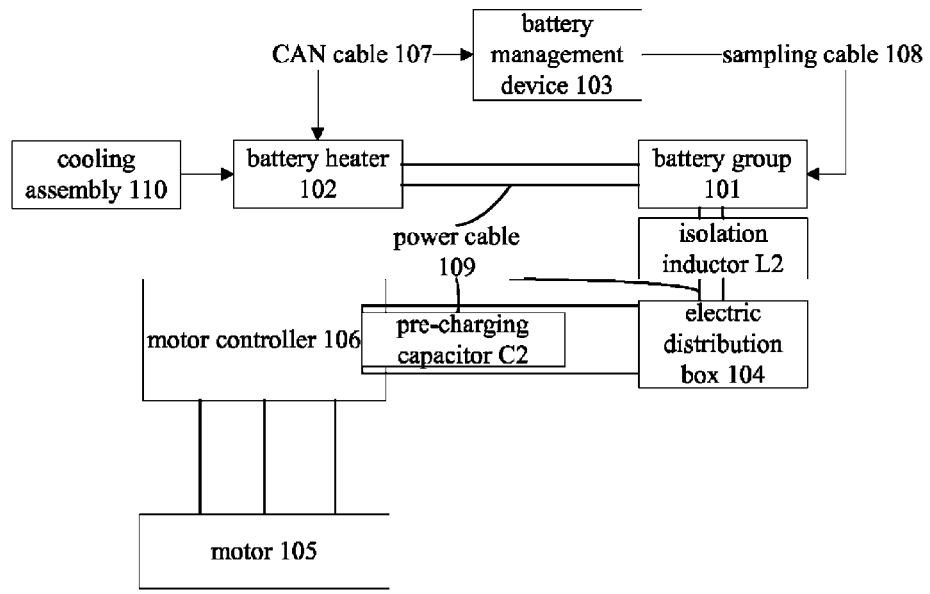
Figure 2:
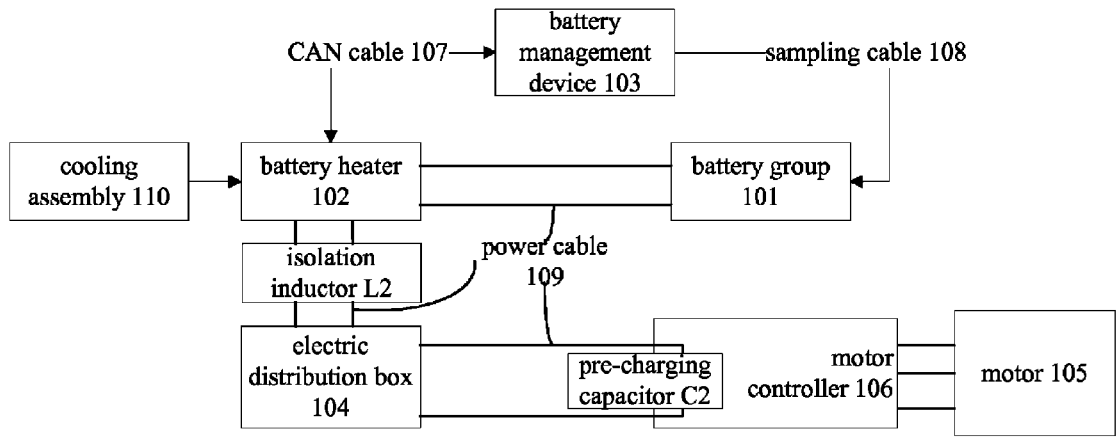
Figure 3:
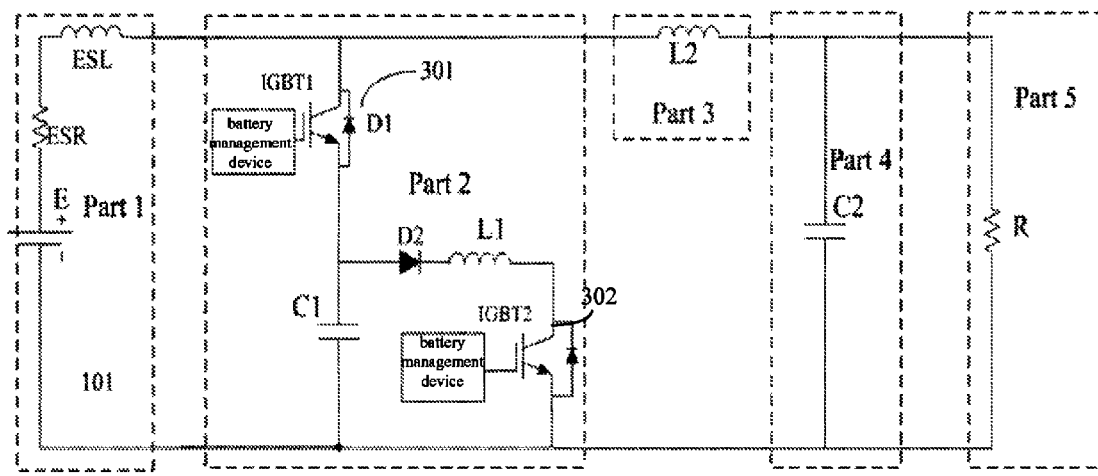
Figure 4:
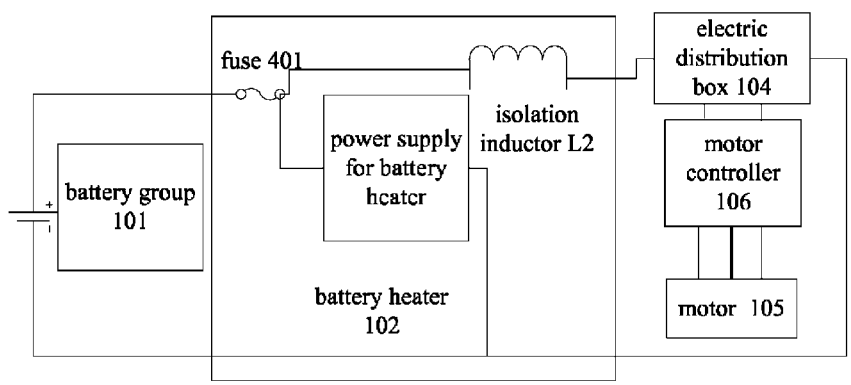
Figure 5:
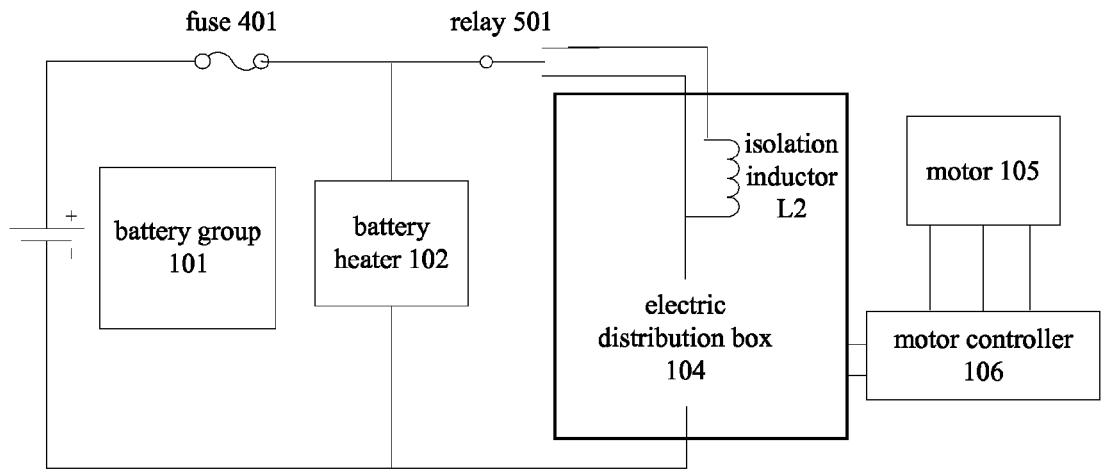
Figure 6:
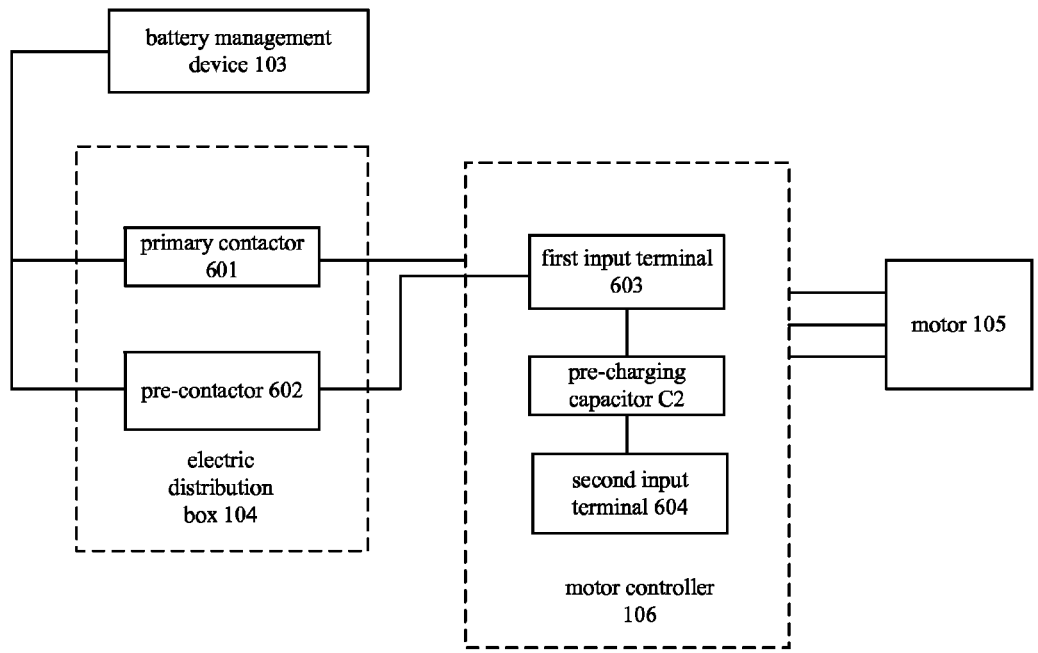
Figure 7:
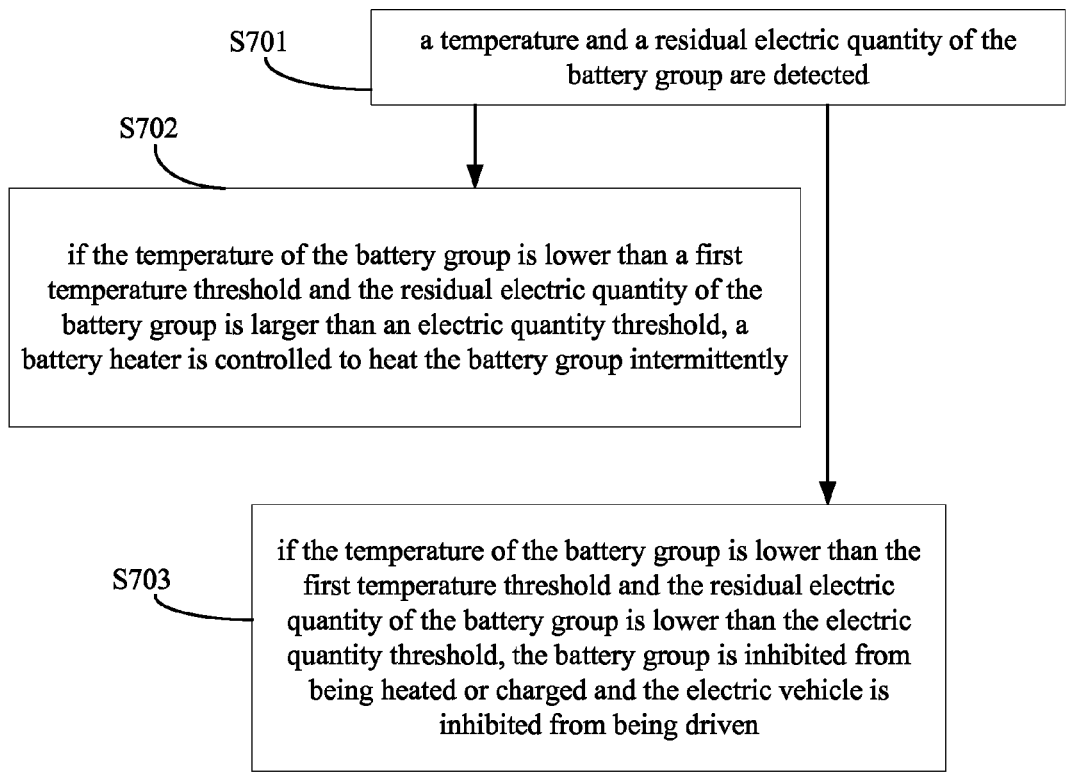
Figure 8:
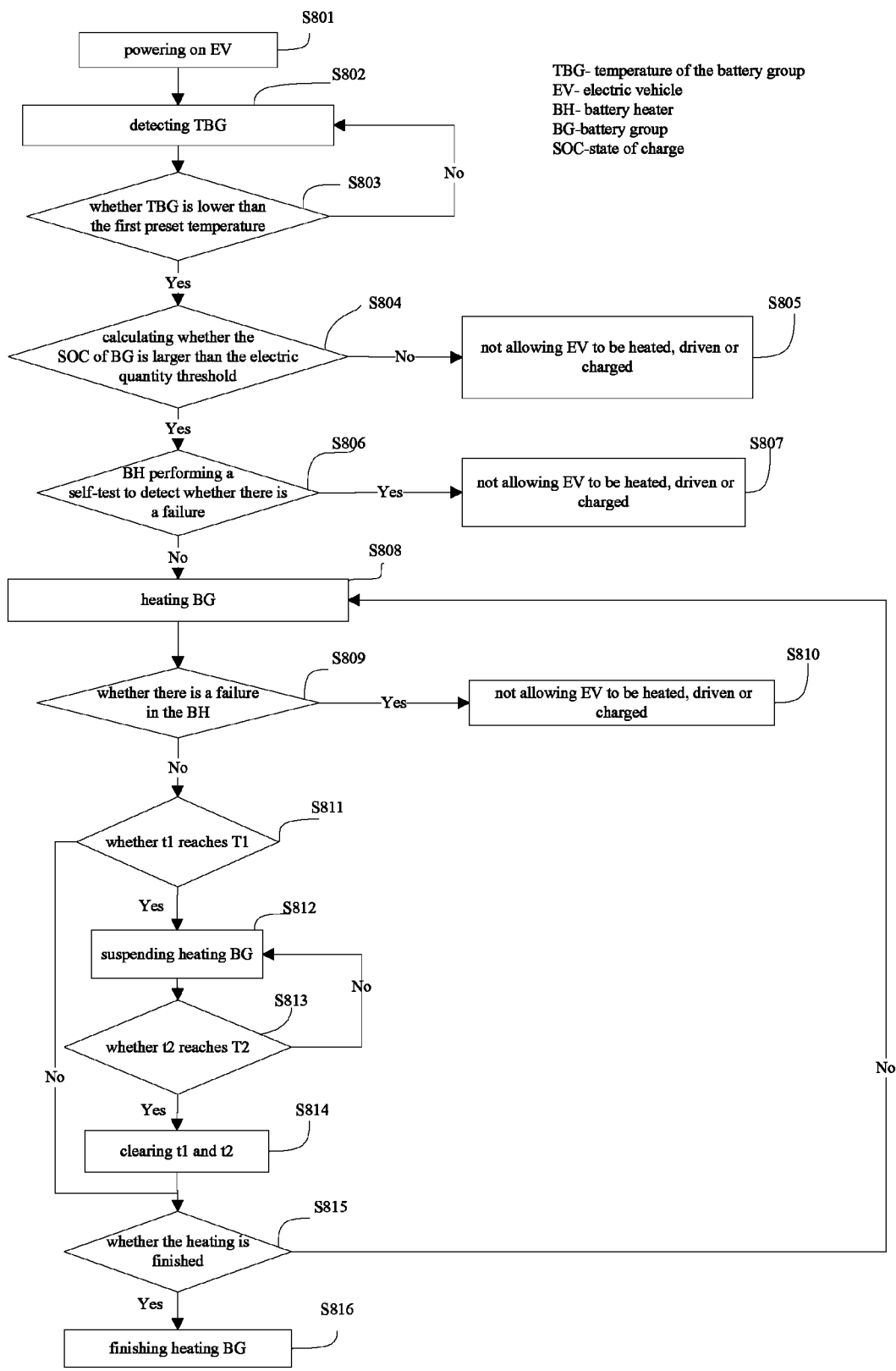
Figure 9:
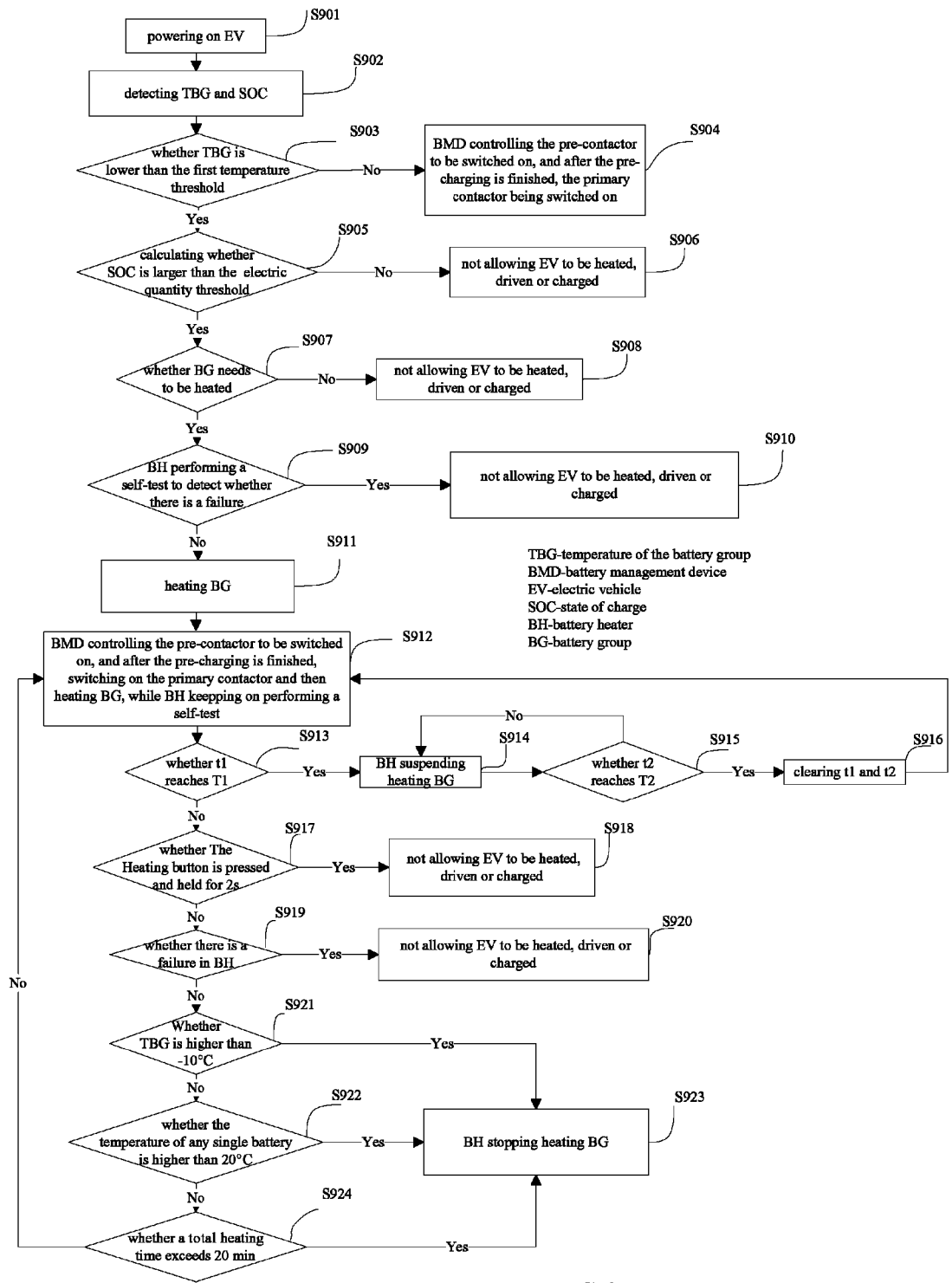
Figure 10A:
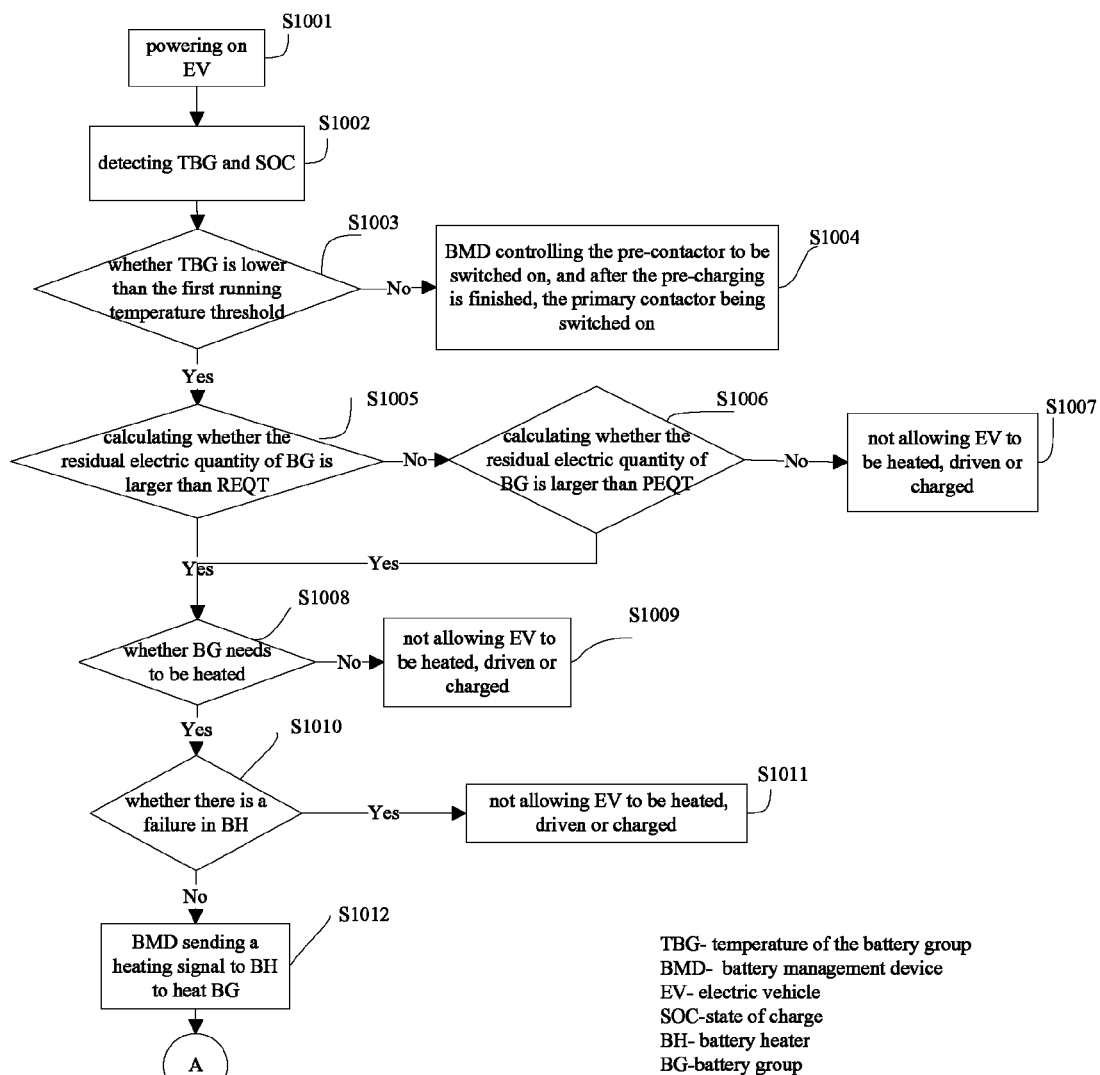
Figure 10B:
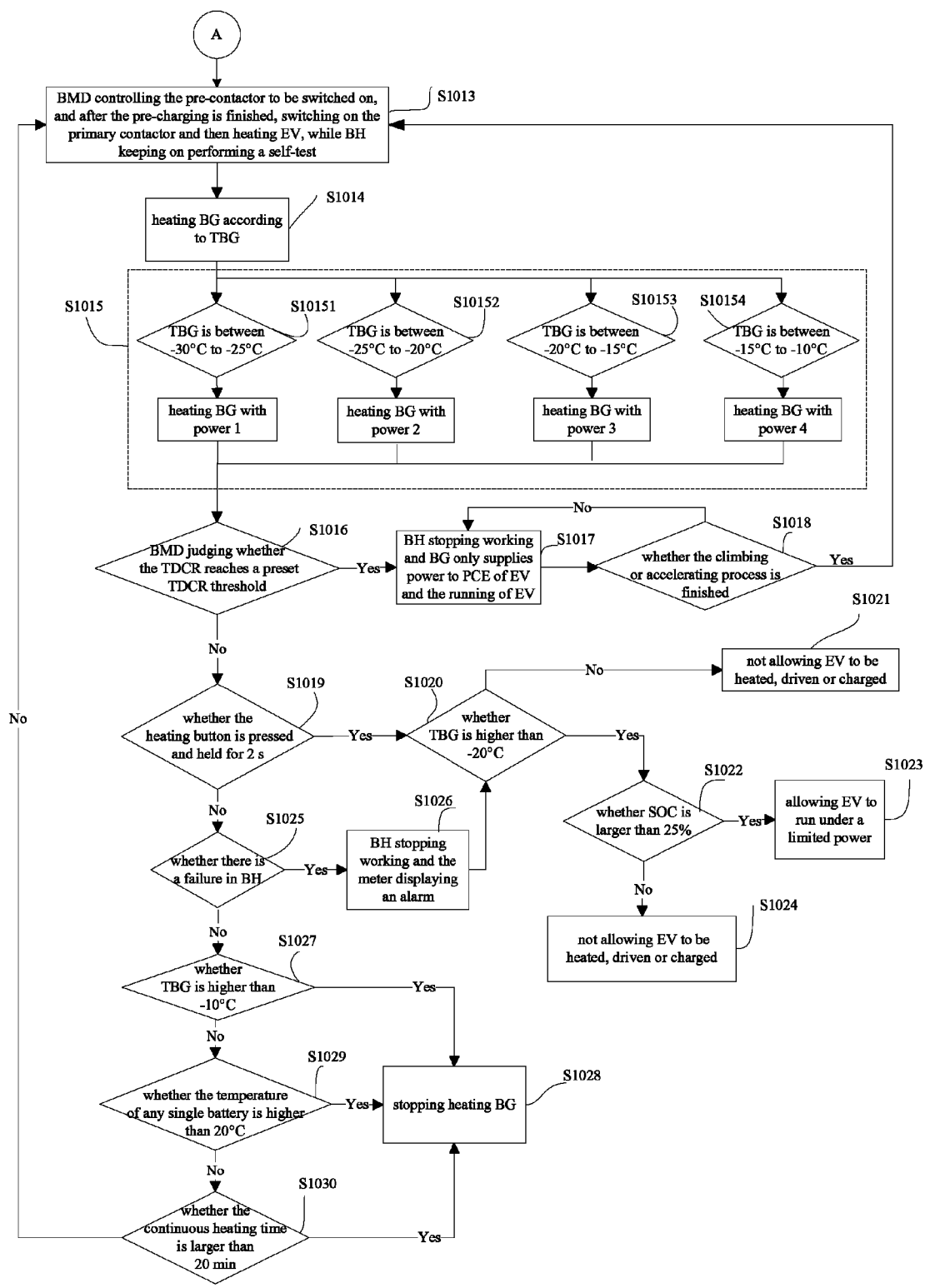

FIG. 1 illustrates a schematic diagram of a power system of an electric vehicle according to an exemplary embodiment;

FIG. 2 illustrates a schematic diagram of a power system of an electric vehicle according to another exemplary embodiment;

FIG. 3 illustrates an electric principle diagram of a power system of an electric vehicle according to an exemplary embodiment;

FIG. 4 illustrates an electric connection diagram of a power system of an electric vehicle according to an exemplary embodiment;

FIG. 5 illustrates an electric connection diagram of a power system of an electric vehicle according to another exemplary embodiment;

FIG. 6 illustrates a schematic diagram of an electric distribution box in a power system of an electric vehicle according to an exemplary embodiment;

FIG. 7 illustrates a flow chart of a method for heating a battery group of an electric vehicle according to an exemplary embodiment;

FIG. 8 illustrates a further flow chart of a method for heating a battery group of an electric vehicle according to an exemplary embodiment;

FIG. 9 illustrates a detailed flow chart of a method for heating a battery group of an electric vehicle according to an exemplary embodiment; and FIGS. 10A-10B illustrate a detailed flow chart of a method for heating a battery group of an electric vehicle according to another exemplary embodiment.

DETAILED DESCRIPTION

Reference will now be made in detail to exemplary embodiments, examples of which are illustrated in the accompanying drawings. It is readily appreciated by those having ordinary skill in the art that the presently claimed subject matter may be embodied in many different forms and should not be construed as limited to the embodiments set forth herein.

In the description, relative terms such as "longitudinal", "lateral", "lower", "upper", "front", "rear", "left", "right", "horizontal", "vertical", "above", "below", "up", "top", "bottom" "external", "internal" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description, terms concerning attachments, coupling and the like, such as "connected" and "interconnected", refer to a relationship in which structures are secured or attached to one another through mechanical or electrical connection, or directly or indirectly through intervening structures, unless expressly described otherwise. Specific implications of the above phraseology and terminology may be understood by those skilled in the art according to specific situations.

A power system of an electric vehicle according to embodiments of the present disclosure is described below with reference to FIGS. 1 to 6.

Referring to FIG. 1 and FIG. 2, according to embodiments of the present disclosure, a power system of an electric vehicle comprises: a battery group 101, a battery heater 102, a battery management device 103, an electric distribution box 104, a motor 105, a motor controller 106 and an isolation inductor L2. The battery heater 102 is connected with the battery group 101 and configured to charge and discharge the battery group 101 to heat the battery group 101. The battery management device 103 is connected with the battery heater 102 and the battery group 101 respectively, and configured to control the battery heater 102 to heat the battery group 101 intermittently when the temperature of the battery group 101 is lower than a first temperature threshold and the residual electric quantity of the battery group 101 is larger than an electric quantity threshold.

The electric distribution box 104 is configured to distribute a voltage output by the battery group 101. The motor controller 106 is connected with the motor 105 and the electric distribute box 104 respectively, and comprises a first input terminal, a second input terminal, and a pre-charging capacitor C2 connected between the first input terminal and the second input terminal. The motor controller 106 is configured to supply power to the motor 105 according to a control command and a voltage distributed to the motor controller 106 by the electric distribution box 104. The isolation inductor L2 is connected between the battery group 101 and the electric distribution box 104, and the inductance of the isolation inductor L2 is matched with the capacitance of the pre-charging capacitor C2.

In some embodiments of the present disclosure, the battery management device 103 is connected with the battery heater 102 via a CAN (controller area network) cable 107 and connected with the battery group 101 via a sampling cable 108 to sample the temperature and voltage of each battery and the output current of the battery group 101. In addition, the battery management device 103 is also configured to judge the current status of the electric vehicle, to calculate the temperature and the residual electric quantity of the battery group 101, and to send the control signals to the relevant electric devices via the CAN cable 107 so as to manage related devices.

The electric distribution box 104 is a high voltage device for turning on and off the large current. A voltage output by the battery group 101 is distributed by the battery management device 103 by sending a control signal to the electric distribution box 104. The motor controller 106 converts the DC supplied by the battery group 101 into the three-phase AC required by the motor 105 to supply power to the motor 105 by the internal driving circuit of the motor controller 106, and controls the motor 105 according to the control signal sent by the battery management device 103.

With the power system according to embodiments of the present disclosure, by using a large current discharge of the battery group 101 in the electric vehicle, the internal resistor of the battery package E (i.e., battery group 101) itself may be heated so that the battery group 101 may be heated. Without any external power supply, the electricity for heating is totally supplied by the battery group 101. A heating management may be performed for the battery group 101 by the battery management device 103 and the battery heater 102, which may greatly reduce the restriction on the use of the electric vehicle at the low temperature, thus satisfying the requirements of running and charging at the low temperature.

Moreover, the power system heats the battery group 101 directly, and therefore, a higher heating efficiency, a lower cost and a better utility may be obtained. In addition, the power system according to embodiments of the present disclosure is capable of heating the battery group 101 intermittently, i.e., heating the battery group 101 for one time period and then suspending heating for another one time period, and performing in this way circularly.

Therefore, the battery group 101 may be heated periodically, and thus the influence of large current on the battery group 101 may be decreased and the life of the battery group 101 may be prolonged. Furthermore, the battery group 101 may be heated with different powers according to a real-time temperature of the battery group 101, and thus a power saving may be effected while the life of the battery group 101 may be prolonged.

In one embodiment of the present disclosure, the battery management device 103 may select a corresponding heating power according to the temperature of the battery group 101, and control the battery heater 102 to heat the battery group 101 with the selected heating power. For example, when the temperature of the battery group 101 is in a range from about −30° C. to about −25° C., the battery group 101 may be heated with one preset heating power; and when the temperature of the battery group 101 is in a range from about −25° C. to about −20° C., the battery group 101 may be heated with another preset heating power. In that way, heating the battery group 101 with an unsuitable heating power when the temperature of the battery group 101 is very low may be avoided.

It is known to those skilled in the art that when the temperature of the battery group 101 is rather low, heating the battery group 101 with a rather high power may damage the battery group 101 and the heating efficiency is poor. Thus, with the battery management device 103, by judging the temperature of the battery group 101, the battery group 101 may be heated with a suitable heating power, and thereby the heating efficiency may be enhanced and the power consumption may be decreased while the life of the battery group 101 may be increased.

In one embodiment of the present disclosure, the battery manager 103 is configured to judge whether a current throttle depth change rate of the electric vehicle reaches a preset throttle depth change rate threshold, and to control the battery heater stop heating the battery group when the current throttle depth change rate reaches the preset throttle depth change rate threshold. It can be understood that, the throttle depth change rate is determined according to a change in the throttle depth during a certain time period, i.e., a driver may control whether to heat the battery group 101 according to the change in the throttle depth in the certain time period.

Specifically, when the electric vehicle is accelerating suddenly or climbing a slope, a large number of electric quantities may be needed, and thus the current throttle depth change rate of the electric vehicle increases (the output power is increasing). As the maximum instant electric quantity output power of the electric vehicle has a limit, the preset throttle depth change rate threshold is a current throttle depth change rate of the electric vehicle when the battery group 101 supplies a maximum power to the electric vehicle. Thus, once the throttle depth change rate reaches the preset throttle depth change rate threshold, the output power of the battery group 101 is maximum but cannot supply any power to the battery heater 102. Therefore, the safety of the battery group 101 may be ensured, over discharging of the battery group 101 is prevented, and the life of the battery group 101 can be increased.

In one embodiment of the present disclosure, the battery management device 103 is further configured to judge whether a heating time reaches a first preset time period and to control the battery heater 102 to suspend heating the battery group 101 when the heating time reaches the first preset time period. In this embodiment, after controlling the battery heater 102 to suspend heating the battery group 101, the battery management device 103 is further configured to calculate a suspension time and control the battery heater 102 to heat the battery group 101 when the suspension time reaches a second preset time period.

For example, assuming the time period of one cycle is 1 minute, in one cycle, the battery group 101 is heated for 45 seconds continuously, then the heating is suspended for 15 seconds (i.e., the suspension time is 15 seconds), and then the above process is repeated so as to heat the battery group 101 intermittently. In this way, continuous impact of large current on the battery group 101 may be avoided, thus reducing a loss of the battery group 101 and prolonging a service life of the battery group 101.

It should be noted that, the heating time duration (represented by T1) and the suspension time duration (represented by T2) is related to property parameters of the battery group 101. For the battery group 101 with better property parameters, the value of T1/T2 is smaller, or else, the value of T1/T2 is larger. In addition, heating the battery group intermittently may reduce an influence of a vortex on a power connector. Therefore, it is necessary to choose different values of T1/T2 according to actual property parameters of the battery group 101.

In one embodiment of the present disclosure, the power system further comprises a heating button connected with the battery management device 103. When the heating button is pressed, the battery management device 103 sends a heating signal to the battery heater 102 to control the battery heater 102 to heat the battery group 101. The battery management device 103 is further configured to: after controlling the battery heater 102 to heat the battery group 101, if the heating button is pressed again, judge whether the operation of pressing the heating button satisfies a preset condition (i.e., judge whether the heating button is pressed and held for a preset time). If yes, indicate the battery group 101 is inhibited from being heated or charged and the electric vehicle is inhibited from being driven.

In other words, during the heating process for the battery group 101, once the heating button is pressed again and held for a preset time, the battery manager device 103 indicates the electric vehicle is inhibited from being heated, driven, or charged. At this time, even if the temperature of the battery group 101 does not exceed the first temperature threshold, the heating of the battery group 101 is stopped. By way of example and without limit, in this embodiment, the first temperature threshold may be about −10° C.

In one embodiment of the present disclosure, the battery heater 102 is further configured to perform a failure self-test (for example, internal elements of the battery heater 102 perform failure self-tests) and send a test result to the battery management device 103. In that way, a failure of the internal elements in the battery heater 102 during the operation process may be detected and treated in time, thus avoiding the damage to the battery heater 102 caused by the failure of the internal elements and consequently avoiding a safety problem caused by the damage to the battery heater 102.

Referring to FIG. 3, the battery heater 102 comprises: a first switch module 301, a first capacitor C1, a first inductor L1 and a second switch module 302. A first terminal of the first switch module 301 is connected with a first electrode of the battery group 101 and the isolation inductor L2 respectively. A first terminal of the first capacitor C1 is connected with a second terminal of the first switch module 301, and a second terminal of the first capacitor C1 is connected with a second electrode of the battery group 101. A first terminal of the first inductor L1 is connected with a node between the first switch module 301 and the first capacitor C1. A first terminal of the second switch module 302 is connected with a second terminal of the first inductor L1, and a second terminal of the second switch module 302 is connected with the second electrode of the battery group 101.

The control terminal of the first switch module 301 and the control terminal of the second switch module 302 are connected with the battery management device 103. The battery management device 103 sends a heating signal to the control terminal of the first switch module 301 and the control terminal of the second switch module 302 to control the first switch module 301 and the second switch module 302 to turn on in turn so as to generate a charge current and a discharge current in turn. When the first switch module 301 is on, the second switch module 302 is off, and when the second switch module 302 is on, the first switch module 301 is off.

Referring to FIG. 3, the ESR is an equivalent resistor of the battery group 101, the ESL is an equivalent inductor of the battery group 101, and E is a battery package. L2 is an isolation inductor and is configured to isolate the battery heating circuit Part 2 from the motor equivalent load circuit Part 5. Therefore, the reversed voltage of the battery group 101 is absorbed by the isolation inductor L2 and may not be applied to the load follow-up. C2 (Part 4) is a pre-charging capacitor; and R (Part 5) is the equivalent load of the motor. When the battery heater is operational, the internal switch modules thereof turn on or off in a certain timing sequence.

Referring to FIG. 3, according to one embodiment of the present disclosure, the switch module (e.g., the first switch module 301 or the second switch module 302) may be an insulated gate bipolar transistor (IGBT). When the battery heater starts to work, the internal elements of the battery heater such as inductors, capacitors are in an initial status and do not store any energy. The work procedure of the battery heater is described below.

When the IGBT1 is on and the IGBT2 is off, the battery package E charges the first capacitor C1 by the charging loop "E-ESR-ESL-D1-C1-E". After the battery package E has charged the first capacitor C1 for a period of time, the voltage of the first capacitor C1 is equal to the voltage of the battery package E. But because there is an inductive element in the circuit, the first capacitor C1 continues being charged so that the voltage of the first capacitor C1 is higher than that of the battery package E.

When the charge current is zero, the first capacitor C1 begins to discharge by the discharging loop "C1-D1-ESL-ESR-E-C1" until the discharge current is zero. When IGBT1 is off and IGBT2 is on, the first capacitor C1 continues discharging by the discharging loop "C1-D2-L1-IGBT2-C1". Due to the existence of the first inductor L1, the first capacitor C1 continues to discharge so that the voltage of the first capacitor C1 is lower than that of the battery package E. The above process is thus repeated.

In one embodiment of the present disclosure, the isolation inductor L2 may prevent the pre-charging capacitor C2 from charging the first capacitor C1 through the first switch module 301 so that the current waveform of the first capacitor C1 may be controlled and thus the characteristics of the heating circuit may be controlled. Therefore, the circuit may run normally. As a result, when the motor 105 and the battery heater 102 operate simultaneously, the isolation inductor L2 may be needed.

In one embodiment of the present disclosure, the inductance L of the isolation inductor L2 may be determined according to the formula $T=2\sqrt{LC}$, where T is an equivalent load operational period of the motor 105 and C is the capacitance of the pre-charging capacitor C2. The battery heater 102 needs to control the IGBT modules and switch on/off the first switch module 301 or the second switch module 302.

Assuming that a switching frequency of the first switch module 301 or the second switch module 302 is t, in order to reduce the influence of the battery heater 102 on the motor controller 106, it may be assumed that a period of a circuit comprising the isolation inductor L2 and the pre-charging capacitor C2 is T. In one embodiment, $T>10t$, thus meeting the design requirements. Therefore, as used herein, the expression "T is an equivalent load operational period of the motor 105" means that T is the period of the circuit comprising the isolation inductor L2 and the pre-charging capacitor C2.

In one embodiment of the present disclosure, the battery heater 102 further comprises a power connector configured to connect and fasten a power cable 109 (shown in FIG. 1). The power connector needs to satisfy the requirement of the anti-vortex. When the battery heater 102 is operational, the frequency of the current is changed very quickly, which leads to sharp increase in the temperature of the magnetic material in the power connector, so the magnetic permeability of the power connector needs to be low. In one embodiment of the present disclosure, the battery heater 102 further comprises a low voltage connector, which is connected and communicates with an external system. The low voltage connector comprises a CAN cable 107 configured to connect to the battery management device 103, a self-test signal cable and a failure signal cable.

Referring to FIG. 2 and FIG. 4, in one embodiment of the present disclosure, the isolation inductor L2 is disposed in the battery heater 102. A fuse 401 is also disposed in the battery heater 102. As shown in FIG. 4, the battery heater 102 comprises the isolation inductor L2, the fuse 401 and a power supply for the battery heater 102. The battery heater 102 further comprises four power connectors, in which two power connectors are connected to the battery group 101 via the power cable 109 and the other two power connectors are connected to the electric distribution box 104 via the power cable 109. In one embodiment of the present disclosure, the power connectors are used in the head end and the tail end of a high voltage cable.

In one embodiment of the present disclosure, the isolation inductor L2 is disposed in the battery heater 102, and when the battery group 101 does not need to be heated, the battery heater 102 may be removed, so that the electric distribution box 104 may be connected directly to the battery group 101. The electric vehicle does not need any battery heater in a high temperature area but needs the battery heater 102 in a low temperature area. Therefore, if the electric vehicle needs to be modified to adapt to different areas, the modification may be small, thus greatly reducing the cost.

Referring to FIG. 1 and FIG. 5, in one embodiment of the present disclosure, the isolation inductor L2 may be disposed in the electric distribution box 104. No matter the isolation inductor L2 is disposed in the battery heater 102 or the electric distribution box 104, the isolation inductor L2 is disposed between the battery group 101 and the electric distribution box 104. Referring to FIG. 1, the electric distribution box 104 is not connected to the battery heater 102 directly. The battery group 101 comprises four power connectors, in which two power connectors are connected to the battery heater 102 via two power cables 109 and the other two power connectors are connected to the electric distribution box 104 via another two power cables 109. In this embodiment, the power system of the electric vehicle further comprises a relay 501 configured to select whether the isolation inductor L2 is connected to the circuit, as shown in FIG. 5. The battery heater 102 is connected in parallel with the electric distribution box 104. The fuse 401 is mounted in the battery group 101.

The isolation inductor L2 is disposed in the electric distribution box 104 so that the influence on the electric distribution box 104 by the battery heater 102 may be greatly reduced. Furthermore, when the battery heater 102 is operational, the isolation inductor L2 may be connected into the circuit by the relay 501, and when the battery heater 102 is not operational, the isolation inductor L2 may be disconnected from the circuit by the relay 501.

In one embodiment of the present disclosure, as shown in FIGS. 1-3, the power system of the electric vehicle further comprises a cooling assembly 110 configured to cool the first switch module 301 and the second switch module 302.

In one embodiment of the present disclosure, the cooling assembly 110 comprises: a wind channel arranged in the battery heater 102; and a fan arranged at one end of the wind channel. The fan is used to dissipate heat for the battery heater 102.

In another embodiment of the present disclosure, the cooling assembly 110 comprises: a coolant channel arranged in the battery heater 102; and a coolant inlet and a coolant outlet arranged in the battery heater 102, respectively. The heat dissipation effect and the sealing performance of the battery heater may be improved by using the coolant to cool the battery heater.

Referring to FIG. 6, the electric distribution box 104 comprises: a primary contactor 601 and a pre-charging-contactor 602. The primary contactor 601 is configured to distribute the voltage output by the battery group 101 to power consumption equipment of the electric vehicle, such as the motor 105 of the electric vehicle. The pre-charging-contactor 602 is connected with the first input terminal 603 or the second input terminal 604 of the motor controller 106, and configured to charge the pre-charging capacitor C2 under the control of the battery management device 103 before the motor controller 106 controls the motor 105 to start.

With the power system of the electric vehicle of the present disclosure, by using the battery group 101 to discharge with large current and by the heating of the internal resistor of the battery group 101, the battery group 101 may be heated. Without any external power supply, the electricity for heating is totally provided by the battery group 101. A heating management may be performed for the battery group 101 by the battery management device 103 and the battery heater 102, which may greatly reduce the restriction on the use of the electric vehicle at the low temperature and satisfy the requirement of running and charging at the low temperature, that is, the battery group 101 may be heated while the electric vehicle may run under the limited power. Moreover, the power system of the electric vehicle heats the battery group 101 directly, and therefore, higher heating efficiency, lower cost and better utility may be achieved.

In one embodiment of the present disclosure, an electric vehicle is provided. The electric vehicle comprises the power system of the electric vehicle mentioned above. The electric vehicle may be capable of running in a low temperature environment, and the electric vehicle may be capable of running while the battery group 101 may be heated, thus ensuring a safe and smooth running.

In the following, a method for heating a battery group of an electric vehicle is described in detail with reference to FIGS. 7-10. In FIGS. 7-10, the detailed values (such as, −10° C.) are only illustrative to explain various thresholds (such as the first temperature threshold), but not used to limit the scope of the present disclosure. The values of various thresholds may be changed according to actual conditions, which is obvious for a person skilled in the art. Furthermore, the executing orders of the steps in FIGS. 7-10 are only illustrative and exemplary, but not used to limit the scope of the present disclosure. The executing order of the steps may be changed according to actual conditions, which is also obvious for a person skilled in the art.

Referring to FIGS. 7 to 10, a method for heating a battery group of an electric vehicle is provided. The method comprises the following steps.

At step S701, a temperature and a residual electric quantity of the battery group are detected.

At step S702, if the temperature of the battery group is lower than a first temperature threshold and the residual electric quantity of the battery group is larger than an electric quantity threshold, a battery heater is controlled to heat the battery group intermittently.

At step S703, if the temperature of the battery group is lower than the first temperature threshold and the residual electric quantity of the battery group is lower than the electric quantity threshold, the battery group is inhibited from being heated or charged and the electric vehicle is inhibited from being driven.

In one embodiment, the first temperature threshold may be about −10° C., and the electric quantity threshold may be about 30% of the total electric quantity of the battery group, without particular limit. For example, the first temperature threshold may be a range near −10° C., for example, about −12° C. to −8° C. The electric quantity threshold is related to the performance and operation time of the battery group. In case the battery group possesses rather excellent performance, the electric quantity threshold may be lower.

Referring to FIG. 8, a method for heating a battery group of an electric vehicle comprises the following steps.

At step S801, the electric vehicle is powered on.

At step S802, the temperature of the battery group is detected.

At step S803, it is judged whether the temperature of the battery group is lower than the first temperature threshold (for example, −10° C. If yes, step S804 is followed; and if no, step S802 is followed.

At step S804, the battery management device calculates whether the residual electric quantity SOC (state of charge) of the battery group is higher than the electric quantity threshold (for example, 30% of the total electric quantity of the battery group). If yes, step S806 is followed; and if no, step S805 is followed.

At step S805, the battery management device sends a message to a meter to display that the residual electric quantity of the battery group is too low so that the electric vehicle is not allowed to be heated, driven or charged.

At step S806, the battery heater (BH) performs a self-test to detect whether there is a failure. If yes, step S807 is followed; and if no, step S808 is followed.

At step S807, the battery management device sends a message to display that there is a failure in the battery heater so that the battery group is inhibited from being and the electric vehicle is inhibited from being driven.

At step S808, the battery heater heats the battery group.

At step S809, the battery heater performs the self-test continuously to confirm whether there is a failure in the battery heater. If yes, step S810 is followed; and if no, step S811 is followed.

At step S810, the battery management device sends a message to display that there is a failure in the battery heater so that the battery group is inhibited from being heated or charged and the electric vehicle is inhibited from being driven.

At step S811, it is detected whether a continuous heating time (t1) reaches a first preset time period (T1). If yes, step S812 is followed, and if no, step S815 is followed.

At step S812, the battery heater suspends heating the battery group.

At step S813, the battery management device judges whether the suspension time (t2) reaches a second preset time period (T2). If yes, step S814 is followed, and if no, step S812 is followed.

At step S814, the heating time (t1) and the suspension time (t2) are both cleared in order to prepare for calculating the heating time and the suspension time in the next cycle.

At step S815, it is judged whether the heating is finished. If yes, step S816 is followed, and if no, step S808 is followed.

At step S816, the heating is finished.

Referring to FIG. 9, a method of heating a battery group of an electric vehicle comprises the following steps.

At step S901, the electric vehicle is powered on.

At step S902, the temperature and the residual electric quantity of the battery group are detected.

At step S903, it is judged whether the temperature of the battery group is lower than the first temperature threshold. If yes, step S905 is followed; and if no, step S904 is followed. In this embodiment, as shown in FIG. 8, the first temperature threshold may be about −10° C.

At step S904, the battery management device controls the pre-charging-contactor to be switched on, and after the pre-charging is finished, the primary contactor is switched on. The electric vehicle runs normally.

At step S905, it is judged whether the current residual electric quantity of the battery group is larger than the electric quantity threshold. If yes, step S907 is followed; and if no, step S906 is followed.

At step S906, the battery management device sends a message to a meter to display that the residual electric quantity of the battery group is too low so that the electric vehicle is not allowed to be heated, driven or charged (e.g., the battery group is not heated or charged).

At step S907, a user confirms whether the battery group needs to be heated. If yes, step S909 is followed, and if no, step S908 is followed. In some embodiments, a heating button is provided in a control panel of the electric vehicle, if the heating button is pressed and the pressing is held for a preset time (for example, 2 seconds), the user confirms to heat the battery group. Those skilled in the art may understand that, the method for confirming the heating may be any of those in the art, without particular limit.

At step S908, the battery management device sends a message to display that the electric vehicle is not allowed to be heated, driven or charged.

At step S909, the battery heater performs a self-test to confirm whether there is a failure in the battery heater. If yes, step S910 is followed; and if no, step S911 is followed.

At step S910, the battery management device stops supplying power and sending a heating signal to the battery heater, and sends a message to the meter to display that there is a failure in the battery heater so that the electric vehicle is not allowed to be heated, driven or charged.

At step S911, the battery management device sends the heating signal to the battery heater to heat the battery group.

At step S912, the battery management device controls the pre-charging-contactor to be switched on, and after the pre-charging is finished, the primary contactor is switched on and then the electric vehicle is heated, and the battery management device sends a maximum output power of the battery group, while the battery heater keeps on performing a self-test.

At step S913, it is judged whether the heating time duration (t1) reaches the first preset time period (T1). If yes, step S914 is followed, and if no, step S917 is followed.

At step S914, the battery heater suspends heating the battery group, and step S915 is followed.

At step S915, the suspension time duration (t2) is calculated, and it is judged whether the suspension time duration (t2) reaches the second preset time period (T2). If yes, step S916 is followed, and if no, step S914 is followed.

At step S916, the heating time duration t1 and the suspension time duration t2 are both cleared in order to prepare for calculating the heating time duration and the suspension time duration in the next cycle, and the battery heater starts to heat the battery group again, i.e., step S912 is followed.

The steps S913-S916 are used to explain how the battery management device controls the battery heater to heat the battery group periodically. For example, provided one heating period is 1 minute, in the one heating period, firstly the battery group is continuously heated for 45 seconds, and then the heating is suspended for 15 seconds. The above process is repeated to heat the battery group in an intermittent manner. Therefore, a continuous impact of the large current on the battery group is avoid, thus reducing a loss of the battery group and prolonging a service life of the battery group.

It should be noted that, the heating time period (represented by T1) and the suspension time period (represented by T2) is related to property parameters of the battery group. For the battery group with better property parameters, the value of T1/T2 is smaller, or else, the value of T1/T2 is larger. In addition, heating the battery group intermittently may reduce an influence of a vortex on a power connector. Therefore, it is necessary to choose different values of T1/T2 according to actual property parameters of the battery group.

At step S917, it is judged whether an operation of pressing the heating button again satisfies a preset condition (i.e., it is confirmed whether the heating button is pressed and held for 2 seconds). If yes, step S918 is followed, and if no, step S919 is followed.

At step S918, the battery management device sends a message to prompt that the user stops heating and charging so that the electric vehicle is not allowed to be heated, driven or charged.

At step S919, the battery heater performs a self-test continuously during the heating process, so as to confirm whether there is a failure in the battery heater during the heating process. If yes, step S920 is followed; and if no, step S921 is followed.

At step S920, the battery management device sends a message to indicate that the battery group is inhibited from being heated or charged and the electric vehicle is inhibited from being driven.

At step S921, it is judged whether the temperature of the battery group is higher than the first temperature threshold (for example, −10° C.). If yes, step S923 is followed; and if no, step S922 is followed.

At step S922, it is judged whether the temperature of any single battery in the battery group is higher than the second temperature threshold (for example, 20° C.). If yes, step S923 is followed; and if no, step S924 is followed.

At step S923, the heating (in this embodiment, heating the battery group when the electric vehicle is running, is also referred to as a running heating mode) is finished and the battery heater stops heating the battery group.

At step S924, it is judged whether a total heating time exceeds the second preset time period (for example, 20 minutes). If yes, step S923 is followed; and if no, step S912 is followed.

According to an embodiment of the present disclosure, when the battery group is heated in the running heating mode, the battery management device is configured to judge whether the current throttle depth change rate of the electric vehicle reaches a preset throttle depth change rate threshold, and to stop heating the battery group when the throttle depth change rate reaches the preset throttle depth change rate threshold. Generally, when the electric vehicle is climbing a slope or accelerating suddenly, the throttle depth change rate may reach the preset throttle depth change rate threshold, and during these climbing and accelerating processes, the battery group cannot output more electric quantity for removing heat from the battery heater. Thus, when the electric vehicle is climbing a slope or accelerating, the battery heater stops heating the battery group, and when the climbing or accelerating process is finished, the battery heater begins to heat the battery group again.

Referring to FIGS. 10A-10B, a method of heating a battery group of an electric vehicle comprises the following steps.

At step S1001, the electric vehicle is powered on.

At step S1002, the temperature and the residual electric quantity of the battery group are detected.

At step S1003, it is judged whether the temperature of the battery group is lower than the first running temperature threshold. If yes, step S1005 is followed; and if no, step S1004 is followed. In this embodiment, as shown in FIG. 10, the first running temperature threshold may be about −10° C.

At step S1004, the battery management device controls the pre-charging-contactor to be switched on, and after the pre-charging is finished, the primary contactor is switched on. The electric vehicle runs normally.

At step S1005, it is judged whether current residual electric quantity is larger than the running electric quantity threshold. If yes, step S1008 is followed; and if no, step S1006 is followed.

At step S1006, the battery management device calculates whether the residual electric quantity of the battery group is larger than an electric quantity threshold enough for heating the electric vehicle under a parking condition (referred to as the first parking electric quantity threshold hereinafter, and in this embodiment, the first parking electric quantity may be about 30% of the total electric quantity of the battery group). If yes, step S1008 is followed, and if no, step S1007 is followed. It is appreciated by those skilled in the art that the first parking electric quantity threshold may be higher than a running electric quantity threshold.

At step S1007, the battery management device sends a message to a meter to display that the residual electric quantity of the battery group is too low so that the electric vehicle is not allowed to be heated, driven or charged.

At step S1008, the user confirms whether the battery group needs to be heated. If yes, step S1010 is followed; and if no, step S1009 is followed. In some embodiments, a heating button is provided in a control panel of the electric vehicle, if the heating button is pressed and the pressing is held for a preset time (for example, 2 seconds), the user confirms to heat the battery group. Those skilled in the art may understand that, the method for confirming the heating may be any of those in the art, without particular limit.

At step S1009, the battery management device sends a message to indicate that the electric vehicle is not allowed to be heated, driven or charged.

At step S1010, the battery heater performs a self-test to confirm whether there is a failure in the battery heater. If yes, step S1011 is followed; and if no, step S1012 is followed.

At step S1011, the battery management device stops supplying power and sending a heating signal to the battery heater, and sends a message to the meter to display that there is a failure in the battery heater so that the electric vehicle is not allowed to be heated, driven or charged.

At step S1012, the battery management device sends the heating signal to the battery heater to heat the battery group.

At step S1013, the battery management device controls the pre-charging-contactor to be switched on, and after the pre-charging is finished, the primary contactor is switched on and then the electric vehicle is heated, and the battery management device sends a maximum output power of the battery group, while the battery heater keeps on performing a self-test.

At step S1014, the battery heater heats the battery group with different parameters according to the temperature of the battery group (for example, the battery heater heats the battery group with different powers according to the temperature of the battery group), as described in Step S1015.

At step S1015, the battery heater heats the battery group with different powers according to the temperature of the battery group.

At step S1016, the battery management device judges whether the throttle depth change rate of the electric vehicle reaches a limit, i.e., the battery management device judges whether the throttle depth change rate of the electric vehicle reaches the preset throttle depth change rate threshold. If yes, step S1017 is followed, and if no, step S1019 is followed.

At step S1017, the battery heater stops heating the battery group, and the battery group only supply power to the power consumption equipment of the electric vehicle and the driving of the electric vehicle. By way of example and without particular limit, if it is required to judge whether the climbing or accelerating process is finished in order to heat the battery group when the climbing or accelerating process is finished, step S1018 is followed.

At step S1018, it is judged whether the climbing or accelerating process is finished. If yes, step S1013 is followed, and if no, step S1017 is followed.

At step S1019, it is judged whether an operation of pressing the heating button satisfies a preset condition (i.e., the heating button is pressed and held for 2 seconds). If yes, step S1020 is followed, and if no, step S1025 is followed.

At step S1020, it is judged whether the temperature of the battery group is higher than the second temperature threshold (for example, −20° C.). If yes, step S1022 is followed; and if no, step S1021 is followed.

At step S1021, the electric vehicle is not allowed to be heated, driven or charged.

At step S1022, it is judged whether the residual electric quantity of the battery group is larger than the second preset electric quantity threshold. If yes, step S1023 is followed; and if no, step S1024 is followed. In this embodiment, as shown in FIG. 10, the second preset electric quantity threshold may be about 25% of the total electric quantity of the battery group.

At step S1023, the electric vehicle is allowed to run under a limited power.

At step S1024, the battery management device sends a message to a meter to prompt that the user stops heating so that the electric vehicle is not allowed to be heated, driven or charged.

At step S1025, it is judged whether there is a failure in the battery heater. If yes, step S1026 is followed; and if no, step S1027 is followed.

At step S1026, the battery heater stops working and the meter displays an alarm.

At step S1027, it is judged whether the temperature of the battery group is higher than the first temperature threshold (for example, −10° C. If yes, step S1028 is followed; and if no, step S1029 is followed.

At step S1028, the heating is finished and the battery heater stops heating the battery group.

At step S1029, it is judged whether the temperature of any single battery in the battery group is higher than the second temperature threshold (for example, 20° C.). If yes, step S1028 is followed; and if no, step S1030 is followed.

At step S1030, it is judged whether the continuous heating time exceeds the preset time (for example, 20 minutes). If yes, step S1028 is followed; and if no, step S1013 is followed.

Referring to FIG. 10 again, in an embodiment of the present disclosure, the step S1015 may comprise the following steps.

At step S10151, it is judged whether the temperature of the battery group is in a range from −30° C. to −5° C. If yes, the battery heater heats the battery group with a first preset power (power 1).

At step S10152, it is judged whether the temperature of the battery group is in a range from −25° C. to −20° C. If yes, the battery heater heats the battery group with a second preset power (power 2).

At step S10153, it is judged whether the temperature of the battery group is in a range from −20° C. to −15° C. If yes, the battery heater heats the battery group with a third preset power (power 3).

At step S10154, it is judged whether the temperature of the battery group is in a range from −15° C. to −10° C. If yes, the battery heater heats the battery group with a fourth preset power (power 4).

In some embodiments, when the electric vehicle is powered on, the battery management device detects the temperature of the battery group and the status of the primary contactor. The temperature of the battery group is an average of temperatures of all single batteries in the battery group. The battery management device samples the temperature of each single battery in the battery group through an information collector and calculates the temperature of the battery group.

If the temperature of the battery group is lower than the first temperature threshold and the residual electric quantity of the battery group is larger than the electric quantity threshold, the user presses and holds the heating button for 2 seconds, and then the battery management device sends a message to the battery heater through the CAN cable to allow the electric vehicle to be heated and driven.

According to an embodiment of the present disclosure, the first temperature threshold may be −10° C., and the electric quantity threshold may be about 30% of the total electric quantity of the battery group. Before heating the battery group in the running heating mode, that is before the motor works, the battery management device sends the control signal to the electric distribution box to control the pre-charging-contactor to be switched on so that the battery group charges the pre-charging capacitor C2. When the voltage of the pre-charging capacitor C2 is substantially equal to that of the battery group, the motor is allowed to work.

In one embodiment of the present disclosure, the heating button is disposed on the meter. Provided that the temperature of the battery group is lower than the first temperature threshold and the residual electric quantity of the battery group is larger than the electric quantity threshold, when the heating button is pressed, the battery heater is allowed to work. If the heating button is pressed again and held for 2 seconds, the battery heater is forced to stop operating.

The primary contactor is disposed in the electric distribution box and configured to connect the motor controller to a power supply or disconnect the motor controller from a power supply. When the residual electric quantity of the battery group is larger than the electric quantity threshold, the battery management device sends the control signal to the electric distribution box to control the primary contactor to be switched on so that the motor is allowed to work. The motor controller converts the DC to the three-phase AC required by the motor through the driving circuit, to supply power to the motor and to allow the electric vehicle to run under a limited power.

The pre-charging-contactor is also disposed in the electric distribution box and connected to the pre-charging capacitor C2 in series. In particular, the pre-charging capacitor C2 is charged before the motor works. The reasons may be as follows. In one aspect, an electrical current shock may be avoided in the pre-charging procedure and an agglomeration caused when the primary contactor is switched on may be avoided. A current limiting resistor is connected in series between the pre-charging capacitor and the pre-charging-contactor. When the pre-charging is finished, the battery management device controls the primary contactor to be switched on and then controls the pre-charging-contactor to be switched off.

In another aspect, since the current is larger at the start moment of the motor, the voltage of the whole battery group is lowered down. Therefore, the pre-charging capacitor C2 is charged firstly until the voltage thereof is substantially equal to that of the battery group, and then the motor is started. Because the voltage of the pre-charging capacitor cannot change suddenly, by connecting the pre-charging capacitor and the motor in parallel, the impact on the voltage of the battery group resulting from the start of the motor may be decreased.

When the battery heater receives the heating signal sent by the battery management device, the battery heater performs a self-test to detect whether there is a failure in the battery heater. In one embodiment of the present disclosure, the battery heater sends a single pulse of 0.5 ms to detect whether there is a failure in the battery heater. If there is not any failure, the battery heater sends a control pulse (for example with a cycle of 20 ms and a duty ratio of 20%) to the internal switch module to make the battery group short the circuit in a short time. So the heating purpose is achieved. Meanwhile the battery heater sends a CAN signal to the meter. The meter receives the CAN signal and displays that "the battery group is being heated".

When the battery group is heated, the battery management device and the battery heater keep on detecting the status of the battery group. If the temperature of the battery group is higher than the first temperature threshold, or the continuous heating time is larger than the heating time duration threshold, or the maximum temperature of a single battery in the battery group is higher than the second temperature threshold, the battery heater stops sending the control pulse to the internal switch module to stop heating the battery group. Further, the battery heater sends a CAN signal to the meter. The meter receives the CAN signal and displays that "the heating is finished". Thus, the heating procedure is completed. In one embodiment of the present disclosure, the second temperature threshold may be 20° C., and the heating time threshold may be the 20 minutes. Preferably, in order to avoid a repeated start of the heating procedure, during the heating process, if the temperature of the battery group is detected to be higher than the first temperature threshold by 5° C. during the heating process of the battery group, the battery group is stopped from being heated.

If the temperature of the battery group is higher than the first temperature threshold, the battery management device works normally. If the temperature of the battery group is lower than the first temperature threshold and the residual electric quantity of the battery group is less than the parking electric quantity threshold, the primary contactor is not switched on and the battery management device sends the CAN signal to the battery heater and the meter, so that the battery group is not allowed to be heated. When the meter receives the CAN signal, the meter displays that "the residual electric quantity of the battery group is not enough" so that the electric vehicle is not allowed to be heated, driven or charged.

If a failure of the battery heater, including under voltage protection, over-voltage protection, overheat protection, pulse width interval protection or maximum turn-on time protection, appears during the self-test process, it is not allowed to heat the battery group. The battery heater sends a failure signal. The meter receives the failure signal and displays that "a failure in the battery heater". The heating is not allowed.

If any failure of the battery heater, including under voltage protection, over-voltage protection, overheat protection, pulse width interval protection or maximum turn-on time protection, appears during the heating process, the battery heater stops heating the battery group and sends a failure signal. The meter receives the failure signal and displays that "a failure in the battery heater". The heating is ceased.

In some embodiments of the present disclosure, the battery heater comprises a protection circuit to prevent the failures mentioned above. The protection circuit is described in detail as follows.

(1) When there is a failure signal, an IGBT in the battery heater is turned off. An ERROR (failure) pin of the protection circuit is set at a low level, and a failure signal is output through an optical coupler. Thus an ERROUT (failure output) pin is at the low level. To release the protection status, the PWM (pulse width modulation) wave should be maintained at a high level for 2 seconds, and then the failure signal is reset and the protection circuit is recovered to a normal status. If the failure signal cannot be reset by the PWM wave in 2 seconds, a permanent error occurs in the protection circuit so that the protection circuit cannot work normally.

(2) To ensure a normal work of a discharge module of the IGBT, the frequency of the pulse sent by a DSP (digital signal processor) may not be too high and the pulse width may not be too long. For example, the maximum pulse width may be 5 ms and the minimum interval may be 7-10 ms, or else a failure signal may be outputted.

(3) In one embodiment of the present disclosure, a DC-DC isolation power supply is used to drive the IGBT. The positive bias voltage for the gate terminal of the IGBT may be +15V, and the negative bias voltage for the gate terminal of the IGBT may be −7V. The negative bias voltage for the gate terminal of IGBT may turn off the IGBT quickly and avoid a malfunction of turning on IGBT because of the overlarge surge current.

(4) In one embodiment of the present disclosure, the protection circuit comprises an under voltage protection circuit. The under voltage protection circuit may avoid an increase in the power consumption of the IGBT caused by the deficient driving voltage. When the driving voltage decreases to a first voltage threshold, the under voltage protection circuit starts to work. In one embodiment of the present disclosure, the first voltage threshold may be 9V.

(5) The over-heat protection circuit may avoid the damage to the IGBT caused by the high temperature. The protection circuit samples the temperature by using a thermistor. When the temperature of the IGBT is higher than a safe temperature threshold, the over-heat protection circuit starts to work. The protection circuit may also be configured to detect whether there is an open circuit in the thermistor. When there is an open circuit in the thermistor, the equivalent impedance is infinite and a protection signal is outputted. In one embodiment of the present disclosure, the safe temperature threshold may be 85° C.

(6) Because there is a large inductance in the discharge loop, when the IGBT is turned off, an over-high voltage may be excited by the collector terminal of the IGBT. So a high voltage capacitor is connected in parallel between the collector terminal and the emitter terminal of the IGBT. The over-voltage protection circuit may avoid the over high voltage of the collector terminal to damage the IGBT at the moment of turning off the IGBT. When the voltage of the collector terminal is larger than a second voltage threshold, a protection signal is outputted. In one embodiment of the present disclosure, the second voltage threshold may be 800V.

During the heating process of the battery group, if the user suddenly presses and holds the heating button for 2 seconds, the battery heater stops heating the battery group so that the battery group is not allowed to be charged and the electric vehicle is not allowed to be driven.

With the method for heating the battery of the power system of the electric vehicle according to embodiments of the present disclosure, the battery group of the electric vehicle may be heated without any external power supply. The battery group is heated to a required temperature and then may be charged or discharged normally. So the restriction on the use of the electric vehicle at the low temperature may be greatly reduced and the requirements of running and charging at the low temperature may be satisfied. In addition, the method according to embodiments of the present disclosure is capable of heating the battery group intermittently, i.e., heating the battery group for one time period and then suspending heating for another one time period, and performing in this way circularly. Therefore, the battery group may be heated periodically, and thus the negative influence of large current on the battery group may be decreased and the life of the battery group may be prolonged. Furthermore, the method according to embodiments of the present disclosure may heat the battery group with different powers according to a real-time temperature of the battery group, and thus a power saving may be effected while the life of the battery group may be prolonged.

In the preceding specification, the subject matter has been described with reference to specific exemplary embodiments. It will, however, be evident that various modifications and changes may be made without departing from the spirit and scope of the claimed subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A power system of an electric vehicle, comprising:
   a battery group;
   a battery heater, connected with the battery group and configured to charge and discharge the battery group to heat the battery group;
   a battery management device, connected with the battery group and the battery heater respectively, and configured to control the battery heater to heat the battery group intermittently when a temperature of the battery group is lower than a first temperature threshold and a residual electric quantity of the battery group is larger than an electric quantity threshold;
   an electric distribution box, configured to distribute a voltage output by the battery group;
   a motor;
   a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and
   an isolation inductor, connected between the battery group and the electric distribution box, wherein an inductance of the isolation inductor matches with a capacitance of the pre-charging capacitor.

2. The power system of claim 1, wherein the battery management device is further configured to judge whether a heating time reaches a first preset time period and to control the battery heater to suspend heating the battery group when the heating time reaches the first preset time period.

3. The power system of claim 2, wherein after controlling the battery heater to suspend heating the battery group, the battery management device is further configured to calculate a suspension time and control the battery heater to heat the battery group when the suspension time reaches a second preset time period.

4. The power system of claim 1, further comprising:
   a heating button, connected with the battery management device, wherein the battery management device sends a heating signal to the battery heater to control the battery heater to heat the battery group when the heating button is pressed.

5. The power system of claim 4, wherein the battery management device is further configured to:
   after controlling the battery heater to heat the battery group, when the heating button is pressed again, judge whether an operation of pressing the heating button satisfies a preset condition; and
   when the operation of pressing the heating button satisfies the preset condition, indicate that the battery group is inhibited from one of being heated and being charged and the electric vehicle is inhibited from being driven.

6. The power system of claim 1, wherein the battery management device is further configured to select a corresponding heating power according to the temperature of the battery group, and to control the battery heater to heat the battery group with the selected heating power.

7. The power system of claim 1, wherein an inductance L of the isolation inductor is determined by a formula:
   $T=2\pi\sqrt{LC}$, where T is an equivalent load operational period of the motor and C is the capacitance of the pre-charging capacitor.

8. The power system of claim 1, the battery heater is further configured to perform a failure self-test and send a test result to the battery management device.

9. The power system of claim 1, wherein the battery heater comprises:
   a first switch module, wherein a first terminal of the first switch module is connected with a first electrode of the battery group and the isolation inductor respectively;
   a first capacitor, wherein a first terminal of the first capacitor is connected with a second terminal of the first switch module, and a second terminal of the first capacitor is connected with a second electrode of the battery group;
   a first inductor, wherein a first terminal of the first inductor is connected with a node between the first switch module and the first capacitor; and
   a second switch module, wherein a first terminal of the second switch module is connected with a second terminal of the first inductor, and a second terminal of the second switch module is connected with the second electrode of the battery group,
   wherein a control terminal of the first switch module and a control terminal of the second switch module are connected with the battery management device, and the battery management device sends the heating signal to the control terminal of the first switch module and the control terminal of the second switch module to control the first switch module and the second switch module to turn on in turn so as to generate a charge current and a discharge current in turn, in which the first switch module is on when the second switch module is off, and the first switch module is off when the second switch module is on.

10. The power system of claim 1, wherein the battery heater further comprises:
   a cooling assembly configured to cool the first switch module and the second switch module.

11. The power system of claim 10, wherein the cooling assembly comprises:
   a wind channel arranged in the battery heater; and
   a fan arranged at one end of the wind channel.

12. The power system of claim 10, wherein the cooling assembly comprises:
   a coolant channel arranged in the battery heater; and
   a coolant inlet and a coolant outlet arranged in the battery heater respectively.

13. The power system of claim 1, wherein the battery heater further comprises a power connector configured to connect and fasten a power cable connected to the battery group.

14. The power system of claim 1, wherein the electric distribution box comprises:

a primary contactor, configured to distribute the voltage output by the battery group to power consumption equipment of the electric vehicle; and a pre-charging-contactor, connected with one of the first input terminal and the second input terminal of the motor controller, and configured to charge the pre-charging capacitor under a control of the battery management device before the motor controller controls the motor to start.

15. An electric vehicle comprising a power system of claim 1.

16. A method for heating a battery group of an electric vehicle, comprising:

detecting a temperature and a residual electric quantity of the battery group by a battery management device;

when the temperature of the battery group is lower than a first temperature threshold and the residual electric quantity of the battery group is larger than an electric quantity threshold, controlling a battery heater to heat the battery group intermittently;

when the temperature of the battery group is lower than the first temperature threshold and the residual electric quantity of the battery group is lower than the electric quantity threshold, indicating that the battery group is inhibited from one of being heated and being charged and the electric vehicle is inhibited from being driven by the battery management device;

judging whether a heating time reaches a first reset time period by the battery management device; and controlling the battery heater to suspend heating the battery group when the heating time reaches the first preset time period.

17. The method of claim 16, further comprising:

calculating a suspension time by the battery management device;

judging whether the suspension time reaches a second preset time period by the battery management device; and controlling the battery heater to heat the battery group when the suspension time reaches the second preset time period.

18. The method of claim 16, further comprising:

judging whether a heating button is pressed by the battery management device;

when the heating button is pressed, controlling the battery heater to heat the battery group; and when the heating button is not pressed, indicating that the battery group is inhibited from one of being heated and being charged and the electric vehicle is inhibited from being driven by the battery management device.

19. The method of claim 18, further comprising:

when the heating button is pressed again, judging whether an operation of pressing the heating button again satisfies a preset condition, and when the operation of pressing the heating button again satisfies the preset condition, indicating that the battery group is inhibited from one of being heated and being charged and the electric vehicle is inhibited from being driven by the battery management device.

20. The method of claim 16, further comprising:

selecting a corresponding heating power according to the temperature of the battery group by the battery management device; and controlling the battery heater to heat the battery group with the selected heating power.

21. The method of claim 16, further comprising:

before controlling the battery heater to heat the battery group, controlling a pre-charging-contactor in the electric distribution box to switch on to charge the pre-charging capacitor, and switching off the pre-charging-contactor after the pre-charging capacitor is charged.

22. The method of claim 16, further comprising:

performing a failure self-test and sending a test result to the battery management device; and indicating that the battery group is inhibited from being heated or charged and the electric vehicle is inhibited from being driven when the test result shows a failure by the battery management device.

23. The method of claim 16, further comprising:

before controlling the battery heater to heat the battery group, judging whether a heating command is received by the battery management device;

when the heating command is received, controlling the battery heater to heat the battery group; and when the heating command is not received, indicating that the battery group is inhibited from being heated or charged and the electric vehicle is inhibited from being driven when the test result shows a failure by the battery management device.

24. The method of claim 16, further comprising:

calculating a current temperature and a current residual electric quantity of the battery group by the battery management device;

calculating a maximum output power of the battery group according to the current temperature and the current residual electric quantity of the battery group by the battery management device; and controlling the electric vehicle to run under a limited power according to the maximum output power of the battery group.

25. The method of claim 16, further comprising: controlling the battery heater to stop heating the battery group when any of following conditions is satisfied:

the temperature of the battery group is higher than the first temperature threshold;

a temperature of any single battery in the battery group is higher than a second temperature threshold, wherein the second temperature threshold is larger than the first temperature threshold; and a continuous heating time of the battery heater is larger than a heating time threshold.

* * * * *